United States Patent [19]

Amano et al.

[11] Patent Number: 5,643,425

[45] Date of Patent: Jul. 1, 1997

[54] SATURATED BRINE TANK IN APPARATUS FOR PRODUCTION OF ELECTROLYZED WATER

[75] Inventors: Naomoto Amano, Okazaki; Yosuke Saito, Tokai, both of Japan

[73] Assignee: Hoshizaki Denki Kabushiki Kaisha, Aichi-Ken, Japan

[21] Appl. No.: 615,984

[22] Filed: Mar. 14, 1996

[51] Int. Cl.⁶ .................. C25B 9/00; B01D 15/00; B01D 35/00; C02F 9/00
[52] U.S. Cl. .................. 204/279; 210/198.1; 210/205; 210/256; 210/257.2
[58] Field of Search .................. 204/275, 279; 210/198.1, 205, 256, 257.2

[56] References Cited

U.S. PATENT DOCUMENTS

| | | | |
|---|---|---|---|
| 3,339,743 | 9/1967 | Bealle | 210/256 |
| 3,401,116 | 9/1968 | Stanwood | 210/205 X |
| 4,613,415 | 9/1986 | Wreath et al. | 204/266 X |
| 5,053,114 | 10/1991 | Maddock | 204/279 X |

*Primary Examiner*—Donald R. Valentine
*Attorney, Agent, or Firm*—Hazel & Thomas

[57] ABSTRACT

A saturated brine tank in an apparatus for production of electrolyzed water having a box-type cabinet formed to contain the vessel of a brine tank mounted thereon and covered with a lid, wherein the brine tank includes a funnel-shaped chute formed to cover an upper opening of the vessel of the brine tank and detachably coupled at its outer periphery with the upper opening of the vessel for introducing an amount of water-soluble salt supplied into the vessel, a netted bag of fine mesh fixedly coupled at its opening end with a lower opening end of the chute to retain the salt introduced therein from the chute, an overflow pipe disposed within the interior of the vessel outside the bag, and a communication pipe connected to the bottom of the vessel for connection to a diluted brine tank.

3 Claims, 3 Drawing Sheets

1

SATURATED BRINE TANK IN APPARATUS FOR PRODUCTION OF ELECTROLYZED WATER

BACKGROUND OF THE INVENTION

1. Field of the Invention

The present invention relates to an apparatus for production of electrolyzed water adapted for use in treatment of foodstuff such as fresh fishes, meat, green vegetables, etc., and more particularly to the construction of a saturated brine tank in the apparatus for production of electrolyzed water.

2. Description of the Prior Art

Illustrated in FIG. 4 is a conventional apparatus for production of electrolyzed water which is composed of a box-type cabinet 1 provided with a door 1a, a saturated brine tank 2 housed within the cabinet 1 to be supplied with water-soluble salt such as table salt and fresh water for preparation of saturated brine, a diluted brine tank 3 arranged under the saturated brine tank 2 to be supplied with the saturated brine and fresh water for preparation of diluted brine of a predetermined concentration and an electrolyzer 5 arranged to be supplied with the diluted brine from tank 3 by means of an electrically operated pump 4 for production of electrolyzed water. As shown in FIG. 5, the interior of the saturated brine tank 2 is subdivided into two chambers C and D by means of a upright partition plate 2b. The chamber C is supplied with an amount of water-soluble salt S such as table salt and fresh water from a water supply pipe 7 under control of a water supply valve 7a for preparation of saturated brine. The saturated brine flows into the chamber D over the upright partition plate 2b, and the surface W of saturated brine in tank 2 is maintained at a predetermined level under control of a float valve 35 disposed in a side chamber B. The diluted brine tank 3 is supplied with the saturated brine from tank 2 through a conduit 9 with a brine supply valve 9a and fresh water from a water supply conduit (not shown) with a water supply valve. Under control of the brine supply valve 9a and the water supply valve, diluted brine of a predetermined concentration is prepared in the diluted brine tank 3.

In the apparatus for production of electrolyzed water, the surface W of saturated brine rises when an amount of salt S has been put into the saturated brine tank 2 at a time. When the surface W of saturated brine exceeds the upper opening end 8a of an overflow pipe 8, an excessive amount of saturated brine is discharged from tank 2 through the overflow pipe 8. In such an instance, an amount of salt particles floating on the saturated brine is discharged with the saturated brine from the overflow pipe 8. This results in useless consumption of the supplied salt and corrosion of metallic parts of the discharge conduit. When the saturated brine tank 2 is cleaned, it is required to remove the salt precipitated in the bottom of tank 2 during washing. However, removal of salt precipitated in the bottom of the chamber C is troublesome, and washing of the brine tank 2 is also disturbed by the partition plate 2b.

SUMMARY OF THE INVENTION

It is, therefore, a primary object of the present invention to provide a saturated brine tank capable of avoiding useless consumption of supplied salt and the occurrence of corrosion of metallic parts of the discharge conduit.

According to the present invention, the object is accomplished by providing a saturated brine tank in an apparatus for production of electrolyzed water having a box-type cabinet formed to contain the vessel of a brine tank mounted thereon and covered with a lid, wherein the brine tank comprises a funnel-shaped chute formed to cover an upper opening of the vessel of the brine tank and detachably coupled at its outer periphery with the upper opening of the vessel for introducing an amount of water-soluble salt supplied into the vessel, a netted bag of fine mesh fixedly coupled at its opening end with a lower opening end of the chute to retain the salt introduced therein from the chute, an overflow pipe disposed within the interior of the vessel outside the bag, and a communication pipe connected to the bottom of the vessel for connection to a diluted brine tank.

BRIEF DESCRIPTION OF THE DRAWINGS

Other objects, features and advantages of the present invention will be more readily appreciated from the following detailed description of a preferred embodiment thereof when take together with the accompanying drawings, in which.

DESCRIPTION OF THE PREFERRED EMBODIMENT

Figure 1:
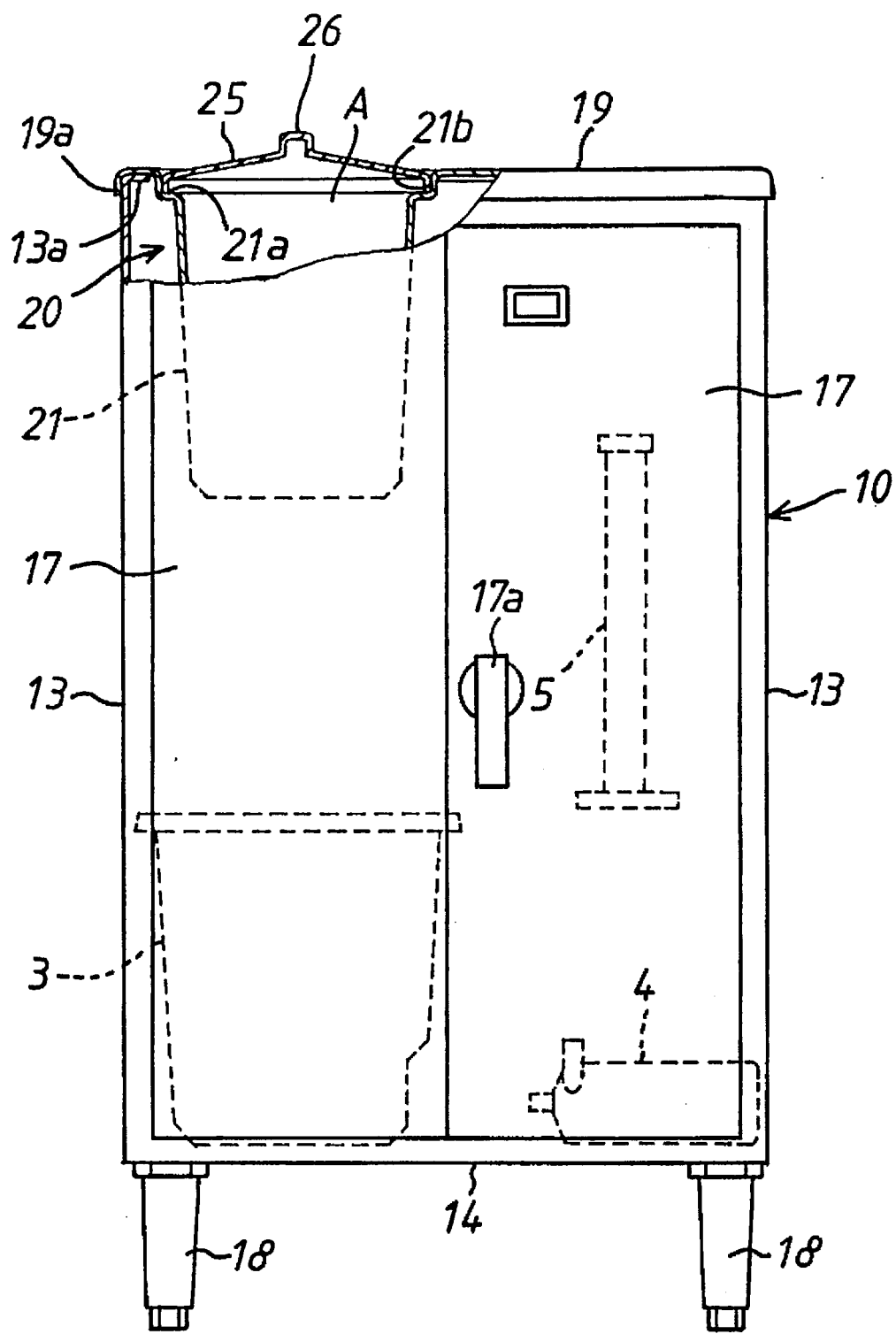
FIG. 1 is a front view of an electrolyzed water production apparatus provided with a saturated brine tank in accordance with the present invention.

Illustrated in FIG. 1 is an electrolyzed water production apparatus which has a box-type cabinet 10 covered with a top panel 19. The cabinet 10 is in the form of a rectangular parallelepipeds box of sheet metal which opens at its top and is provided at its bottom plate 14 with four support legs 18 secured thereto. A pair of side plates 13 of cabinet 10 each are bent inwardly at their upper edges to form horizontal support portions 13a. A pair of doors 17 are hinged to the side plates 13 to close a front opening formed between the side plates 13. The right-hand door 17 is provided with a handle 17a. The top panel 19 is made of synthetic resin and is integrally formed with the vessel 21 of saturated brine tank 20 and at its outer periphery with a downward flange 19a which is tightly engaged with each upper periphery of the side plates 13.

Figure 2:
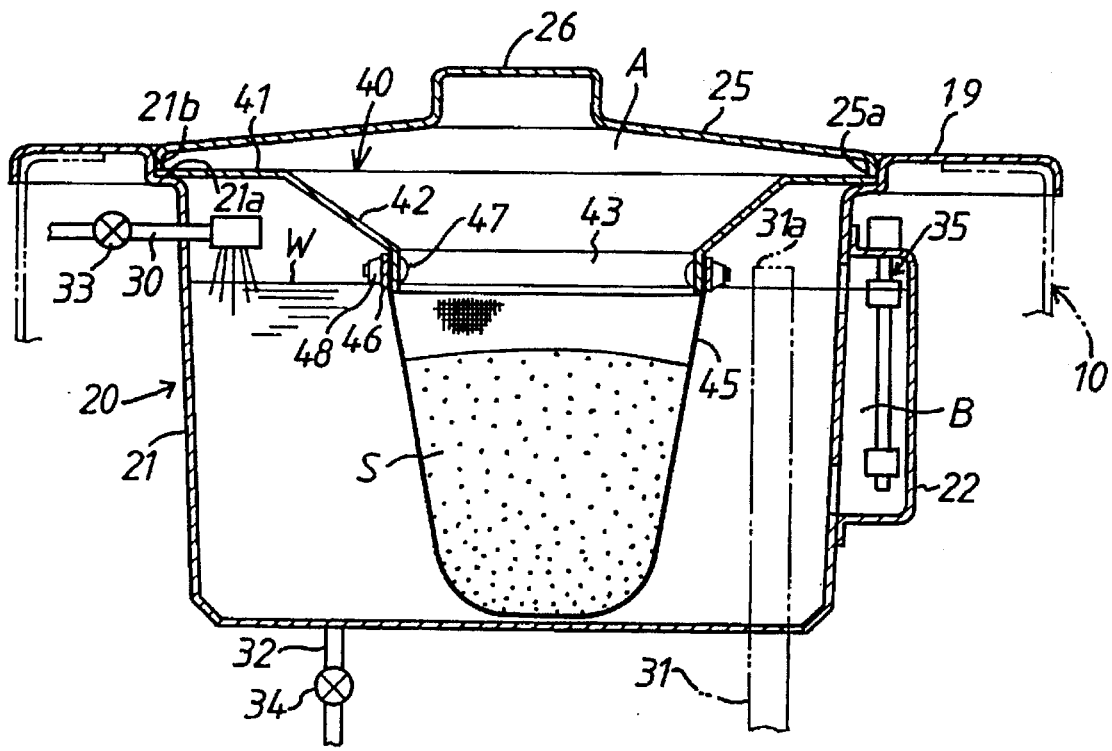
FIG. 2 is a vertical sectional view of the saturated brine tank shown in FIG. 1.

As shown in FIGS. 1 and 2, the vessel 21 of saturated brine tank 20 is closed by a lid 25 coupled therewith. The vessel 21 is of rectangular in cross-section and has an upper rectangular opening A formed to be supplied with an amount of salt therein. The vessel 21 is integrally formed with a horizontal peripheral flange portion 21a and an upturned portion 21b extending upwards from the horizontal peripheral flange portion 21a and integrally formed at its upper edge with the top panel 19. Preferably, the vessel 21 and top panel 19 are made of synthetic resin such as polyvinyl chloride, ABS resin or other anticorrosive material by vacuum forming.

As shown in FIGS. 1 and 2, the lid 25 is integrally formed with a vertical rim portion 25a at its outer periphery and a grip portion 26 at its central portion. The lid 25 is also made of synthetic resin such as polyvinyl chloride, ABS resin or other anticorrosive material by vacuum forming. The vertical rim portion 25a of lid 25 coupled with the upturned portion 21b of vessel 21. The lower edge of the vertical rim portion 25a is supported on the horizontal peripheral flange portion 21a of vessel 21 through an outer peripheral flat flange 41 of a funnel-shaped chute 40.

Figure 3:
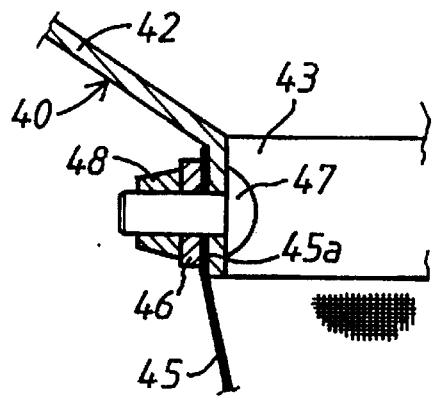
FIG. 3 is an enlarged sectional view of a connecting portion of a netted bag with a funnel-shaped chute shown in FIG. 2.
Figure 4:
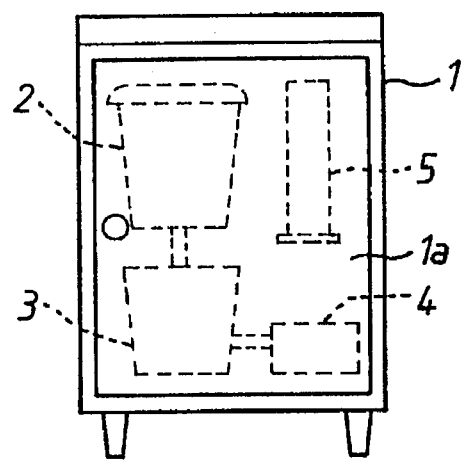
FIG. 4 is a front view of a conventional electrolyzed water production apparatus.
Figure 5:
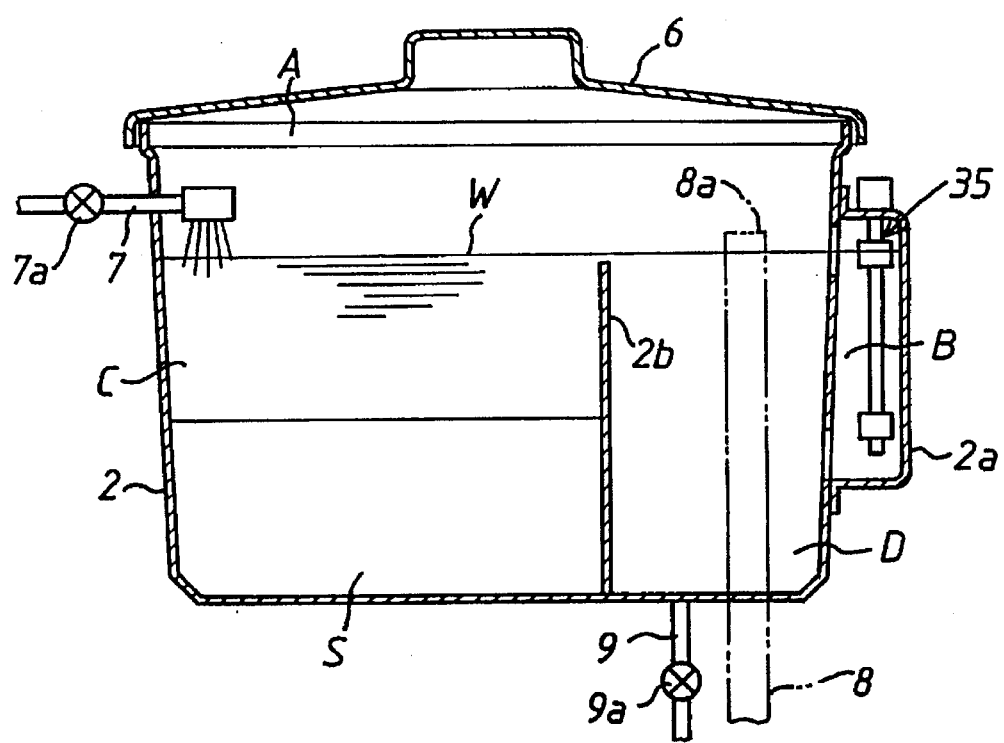
FIG. 5 is a vertical sectional view of a saturated brine tank shown in FIG. 4.

As shown in FIGS. 2 and 3, the funnel-shaped chute 40 has a conical portion 42 concentrically formed with the outer peripheral flat flange 41 at its upper end and with a cylindrical flange 43 at its lower end. The chute 40 is also made of synthetic resin such as polyvinyl chloride, ABS resin or other anticorrosive material. In this embodiment, the outer peripheral flat flange 41 of chute 40 is detachably coupled with the upturned portion 21b of vessel 21 and placed on the horizontal peripheral flange portion 21a of vessel 21 to support the funnel-shaped chute 40 on the vessel 21.

A netted bag 45 is coupled over the cylindrical flange 43 of chute 44 at its upper opening portion 45a and fastened in place by means of rivets 47 and nuts 48 through a band 46. The netted bag 45 is made of a net material of fine mesh knitted out of nylon fiber and sewn in the shape of a bag. The mesh size of bag 45 is determined to block particles of salt passing through the bag. In this embodiment, the netted bag 45 is adapted to provide a sufficient area in contact with fresh water supplied into the vessel 21. The netted bag 45 may be welded by heat to the cylindrical flange 43 of chute 44.

As shown in FIG. 2, a side case 22 is secured to the side surface of vessel 21 to form a side chamber B in open communication with the interior of vessel 21. A float valve 35 is disposed within the side chamber B to detect the surface W of saturated brine in tank 20. A water supply pipe 30 extending into the upper portion of vessel 21 is provided with a water supply valve 33 which is opened or closed under control of the float valve 33 to maintain the surface of saturated brine in tank 20 at a predetermined level. An overflow pipe 31 extending upwards into the interior of vessel 21 is located outside the netted bag 45 to discharge an excessive amount of saturated brine from its upper opening end 31a. A communication pipe 32 connected to the bottom of vessel 21 is provided with a brine supply valve 34 to supply the saturated brine into the diluted brine tank 3 from the saturated brine tank 2.

In use of the saturated brine tank 20, an amount of water-soluble salt S such as table salt is put into the netted bag 45. In such an instance, particles of supplied salt are introduced into the netted bag 45 by means of the chute 40 and retained in the bag 45 without entering into the interior of vessel 21. Thus, the salt dissolves in fresh water supplied into the saturated brine tank 20 to produce saturated brine in tank 20. Although in this embodiment, the water supply pipe 30 is arranged above the surface W of saturated brine for connection to a source of water, the water supply pipe 30 may be arranged to direct supply of fresh water toward the netted bag 45 thereby to accelerate dissolution of the supplied salt.

The saturated brine produced in tank 20 is supplied into the diluted brine tank 3 through the communication pipe 32 under control of the brine supply valve 34, while fresh water is supplied into the diluted brine tank 3 through a water supply pipe (not shown) under control of a water supply valve (not shown). Thus, diluted brine of a predetermined concentration is produced in tank 3 under control of the supply valves. The diluted brine is supplied into an electrolyzer 5 by means of an electrically operated pump 4 and electrolized to produce alkaline adapted for use in treatment of foodstuff such as fresh fishes, meat, green vegetables, etc.

When the amount of salt in saturated brine tank 2 decreases, the lid 25 is removed to supply an amount of salt S into the netted bag 45 through the chute 40 at a time. If the surface W of water rises above the upper opening end 31a of overflow pipe 31, an excessive amount of saturated brine in tank 20 is discharged from the overflow pipe 31. Although in this instance, particles of the supplied salt S temporarily float on the saturated brine, the particles of supplied salt are retained in the netted bag 45 without being discharged from the overflow pipe 31 together with the saturated brine. This is useful to avoid useless consumption of the supplied salt S and to avoid the occurrence of corrosion of the metallic parts of the discharge conduit caused by salt particles adhered thereto.

When the chute 40 is removed from the saturated brine tank 2, the particles of salt precipitated in the netted bag 45 can be removed without being remained in the saturated brine tank 20. This is useful to facilitate cleaning of the saturated brine tank 20 and to avoid useless consumption of salt in cleaning of the saturated brine tank 20. In the embodiment described above, it is advantageous that the overflow pipe 31 and communication pipe 32 can be provided at an appropriate place of vessel 21 without any restriction.

Although in the embodiment described above, the vessel 21 of saturated brine tank 20 is integrally formed with the top panel 19 of cabinet 10, the vessel 21 may be provided separately from the top panel 19 of cabinet 10.

What is claimed is:

1. A saturated brine tank in an apparatus for production of electrolyzed water having a box-type cabinet formed to contain the vessel of a brine tank mounted thereon and covered with a lid, wherein said brine tank comprises a funnel-shaped chute formed to cover an upper opening of the vessel of said brine tank and detachably coupled at its outer periphery with the upper opening of said vessel for introducing an amount of water-soluble salt supplied into said vessel, a netted bag of fine mesh fixedly coupled at its opening end with a lower opening end of said chute to retain the salt introduced therein from said chute, an overflow pipe disposed within the interior of said vessel outside said bag, and a communication pipe connected to the bottom of said vessel for connection to a diluted brine tank.

2. A saturated brine tank as claimed in claim 1, wherein said funnel-shaped chute is made of an anticorrosive material and has a conical portion integral with an outer peripheral portion formed to be coupled with the upper opening of the vessel of said saturated brine tank.

3. A saturated brine tank as claimed in claim 1, wherein said vessel is integrally formed with a top panel of said box-type cabinet.

* * * * *